(12) United States Patent
Faraone (10) Patent No.: US 9,826,880 B1
(45) Date of Patent: Nov. 28, 2017

(54) APPARATUS FOR USE AS A UNIVERSAL KICKSTAND

(71) Applicant: Rosemarie Faraone, Chicago, IL (US)

(72) Inventor: Rosemarie Faraone, Chicago, IL (US)

( * ) Notice: Subject to any disclaimer, the term of this patent is extended or adjusted under 35 U.S.C. 154(b) by 0 days.

(21) Appl. No.: 15/197,095

(22) Filed: Jun. 29, 2016

(51) Int. Cl.
| | |
|---|---|
| F16M 11/00 | (2006.01) |
| A47L 13/51 | (2006.01) |
| F16M 13/02 | (2006.01) |
| F16B 47/00 | (2006.01) |
| F16B 1/00 | (2006.01) |
| F16B 2/22 | (2006.01) |
| F16B 2/00 | (2006.01) |

(52) U.S. Cl.
CPC ............... A47L 13/51 (2013.01); F16B 1/00 (2013.01); F16B 2/005 (2013.01); F16B 2/22 (2013.01); F16B 47/00 (2013.01); F16M 13/022 (2013.01); F16B 2001/0035 (2013.01)

(58) Field of Classification Search
CPC ................ F16M 11/28; F16M 11/046; F16M 2200/028; F16M 13/02; F16M 11/10; F16M 11/18; F16M 13/00; F16M 7/00; F16M 2200/027; F16M 2200/08; F16M 11/041; F16M 13/022; F16M 11/24; F16M 2200/024
USPC ......... 248/354.1, 354.3, 354.4, 354.5, 354.6, 248/354.7, 150, 163.1, 688
See application file for complete search history.

(56) References Cited

U.S. PATENT DOCUMENTS

| | | | | |
|---|---|---|---|---|
| 5,297,771 A | * | 3/1994 | Gilbert | G10D 3/003 248/443 |
| 5,566,915 A | * | 10/1996 | Hansare | F16M 11/00 248/188.8 |
| 5,664,758 A | * | 9/1997 | Smith | G10D 9/00 248/688 |
| 6,536,723 B1 | * | 3/2003 | Nakatani | F16B 7/14 248/163.1 |
| 8,226,055 B2 | * | 7/2012 | Nakatani | F16M 11/14 248/168 |
| 8,714,497 B2 | * | 5/2014 | Bricker | B25B 11/00 172/371 |
| D751,872 S | * | 3/2016 | Brandon | D8/1 |
| 2012/0137548 A1 | * | 6/2012 | Kimball | A01B 1/02 37/266 |
| 2014/0346316 A1 | * | 11/2014 | Sitzmann | A01D 46/243 248/688 |
| 2016/0183393 A1 | * | 6/2016 | Groom | A45C 11/00 280/33.992 |

\* cited by examiner

*Primary Examiner* — Steven Marsh
(74) *Attorney, Agent, or Firm* — Quarles & Brady LLP (57) ABSTRACT

A device for supporting a long handled tool in an upright position includes a rod comprising an upper section and a lower section, a collar pivotally attached to the upper section of the rod, and a foot pivotally coupled to the lower section of the rod. One of the upper and lower sections is telescopically received within the other of the upper and lower sections of the rod, and the collar is cylindrically shaped and has an opening on a front side thereof to receive the long handled tool.

20 Claims, 9 Drawing Sheets

APPARATUS FOR USE AS A UNIVERSAL KICKSTAND

BACKGROUND

Long handled cleaning tools, such as brooms, mops, rakes, and shovels have historically been difficult to set down without having to lay the entire tool on the ground, or rest the tool against a wall or other vertical surface. While repeatedly setting down and then picking up a long handled tool may not be difficult for some, for those with limited physical abilities, this task can be very difficult. Still further, even though walls or vertical surfaces may sometimes be available for resting a long handled tool against, often times after resting the tool against a wall, the device will fall to the ground, thus putting the user of the tool in the same situation as had she originally placed the tool on the ground.

Further, operation of a typical household requires the use of more than one long handled tool. For example, many households use two or more of a broom, a mop, a rake, and a shovel to complete any number of household chores. As a result, the aforementioned problems arise with each of these tools. Thus, including a permanent fixture on any single tool does not necessarily provide the most economical solution for the aforementioned problem because a permanent fixture would increase the overall price of each tool. While it is known to rest or store long handled devices on a hook, hanger, or other clip mechanism, these storage facilitation devices do not help users during use of any one of the previously mentioned long handled tools.

Still further, long handled tools have handles of varying lengths, diameters, and may be formed from a number of materials. As a result, a fixture or device that is attachable to a single type of long handled tool may not be compatible with other tools having differing sizes or comprising different materials. Currently, no device exists that solves the aforementioned problems. As a result, a device that is attachable to many different types of long handled devices that can be easily engaged or disengaged by a user to allow a user to rest a wide variety of long handled tools in an upright position would be desirable. The following disclosure provides for a device that solves one or more of the aforementioned problems.

SUMMARY

In one aspect, a device for supporting a long handled tool in an upright position includes a rod comprising an upper section and a lower section, a collar pivotally attached to the upper section of the rod, and a foot pivotally coupled to the lower section of the rod. One of the upper and lower sections is telescopically received within the other of the upper and lower sections of the rod, and the collar is cylindrically shaped and has an opening on a front side thereof to receive the long handled tool. In some forms, a plurality of vertical ribs are included along an outer surface of the collar. In some embodiments, the upper section and the lower section of the rod comprise polypropylene. In some embodiments, an attachment mechanism is coupled with an outer surface of the collar. In some forms, the attachment mechanism is a magnet. In other embodiments, the attachment is a suction cup pad having a plurality of suction cups provided thereon. In some embodiments, a pivot stop is provided along a distal end of the lower section of the rod. In some forms, the foot includes a nonslip pad.

In some embodiments, a device for supporting a long handled tool in an upright position includes a telescopically maneuverable rod comprising an upper section and a lower section, an elastomeric cylindrically shaped collar having an interior surface that is snap fit with a tool, the collar coupled with an end of the rod, a collar housing coupled with an exterior surface of the collar, and a foot pivotally coupled to the lower section of the rod. In some forms, a plurality of ribs are provided along at least a portion of the exterior surface of the collar. In some embodiments, an interior surface of the collar has a coating applied thereto. In some embodiments, the collar housing comprises a rectangular box having an aperture provided on a face thereof for pivotal movement of the rod. In some embodiments, a protrusion extends from the exterior face of the collar into the housing. In some forms, the end of the rod is coupled with the protrusion. In some embodiments, a bottom surface of the foot includes a nonslip pad.

In some embodiments, a device for supporting a long handled tool in an upright position includes a telescopically maneuverable rod comprising an upper section and a lower section, a collar having an interior surface that is snap fit with a tool, the collar coupled with an end of the rod, and the collar having a plurality of ribs provided along an exterior surface thereof, a collar housing coupled with the exterior surface of the collar, and a foot pivotally coupled with the lower section of the rod. In some embodiments, the rod comprises polypropylene. In some embodiments, the collar housing comprises a rectangular shaped aperture provided in a bottom end thereof for pivotal movement of the rod. In some embodiments, the upper section and the lower section of the rod are telescopically engaged with a moveable friction fit. In some forms, the collar comprises high density polyethylene.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
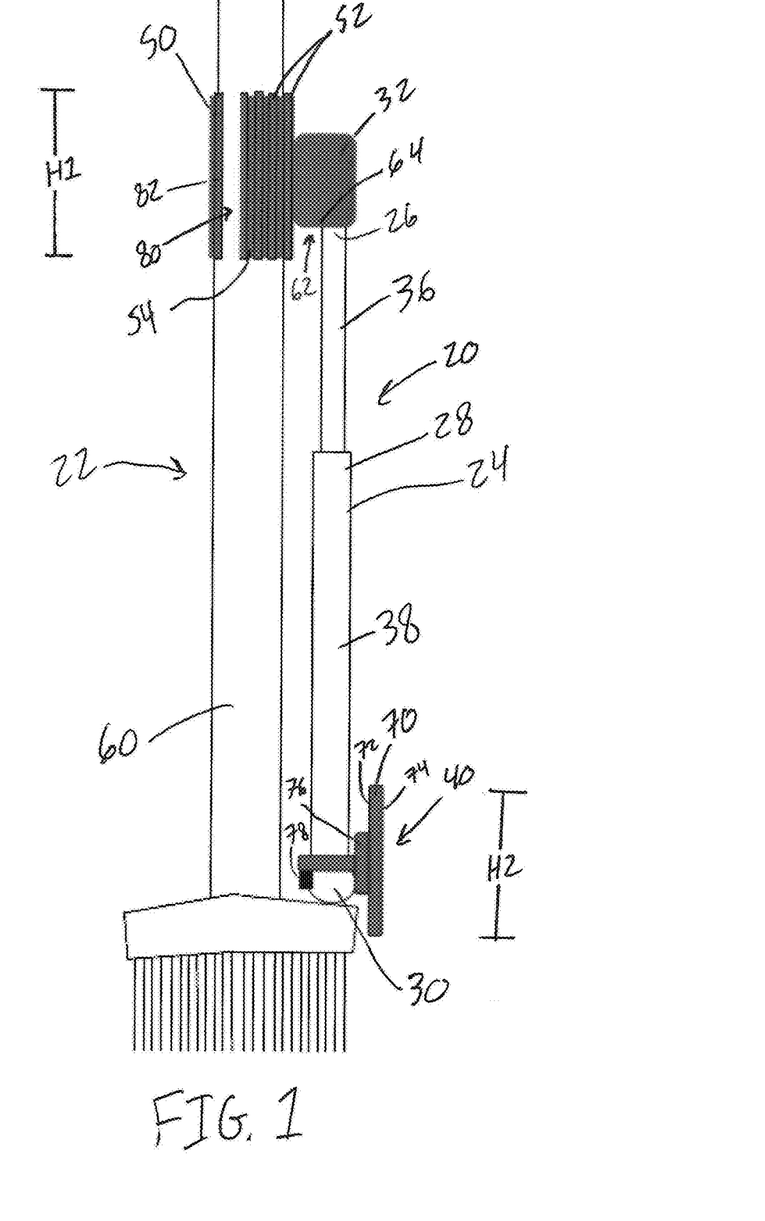
FIG. 1 illustrates a left side elevational view of a device that operates as a kickstand in a closed configuration, with the device being coupled to a long handled tool.

FIG. 1 illustrates a side elevational view of a device 20 that operates as a universal kickstand that maintains long-handled tools upright when such tools are not in use. The device 20 is shown coupled to a long-handled tool 22, which may be a broom, a mop, a shovel, a rake, or any other long handled tool known to those of ordinary skill in the art. In the illustrated embodiment, the long-handled tool 22 is a broom. In some embodiments, the device 20 comprises a rod 24 having a proximal end 26, a midsection 28, and a distal end 30. The proximal end 26 of the rod 24 is pivotally connected with a collar housing 32 via a securement mechanism 34 (see FIG. 7), which may be a pin, a bearing, a screw, a nail, a rivet, or any other suitable securement mechanism. The midsection 28 comprises an upper section 36 and a lower section 38. In some embodiments, the upper section 36 is telescopically received by the lower section 38. In some embodiments, an intermediate section (not shown) is telescopically received by the lower section 38 and telescopically receives the upper section 36. In some embodiments, the upper section 36 telescopically receives the lower section 38. In this manner, any number of telescoping sections may be utilized and/or the telescoping may occur in any direction (i.e., from top to bottom or bottom to top). A foot 40 is coupled to the distal end 30 of the rod 24.

Referring to FIGS. 1-4 and 7-9, the collar housing 32 is secured to a collar 50. In some embodiments, the collar 50 comprises a polymer, which may be polypropylene, polystyrene, high density polyethylene, low density polyethylene, or any other polymer known to those of ordinary skill in the art. In some embodiments, the collar housing 32 comprises one of the aforementioned elastomeric polymers. Further, the collar 50 and/or the collar housing 32 may be formed from a lightweight metal or a natural material. Regardless, the collar 50 comprises one or more materials that are flexible to allow the collar to be opened to accommodate various sizes of tools, as will be discussed in greater detail below.

Figure 2:
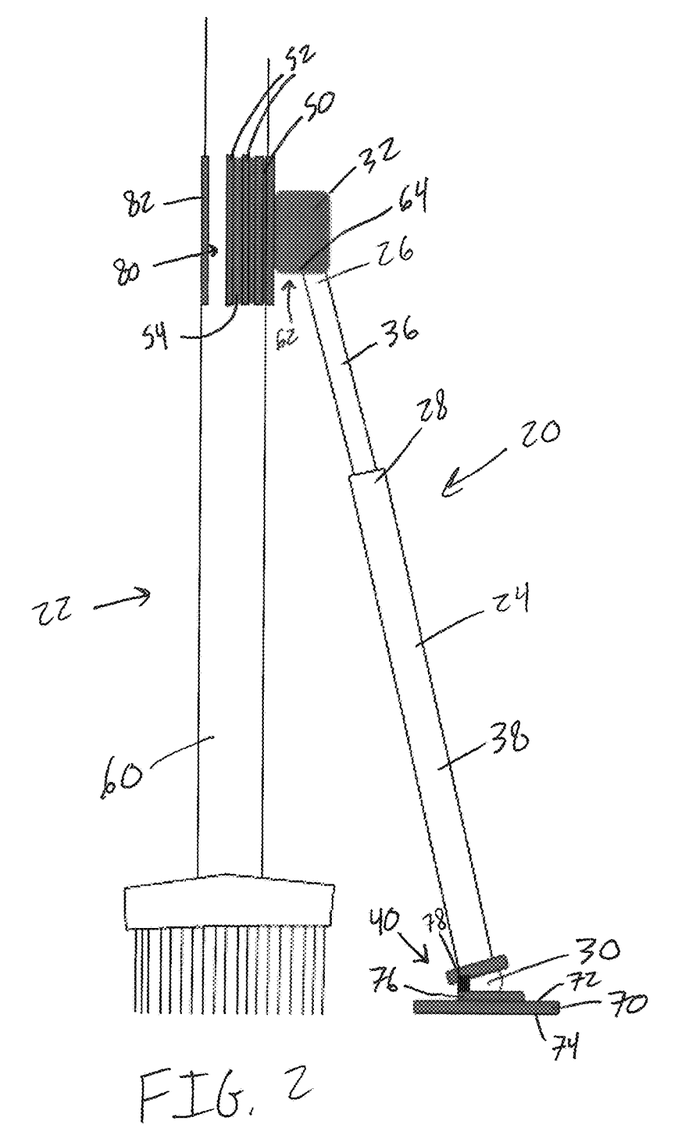
FIG. 2 is a left side elevational view of the device and long handled tool of FIG. 1 with the device in an open configuration.
Figure 3:
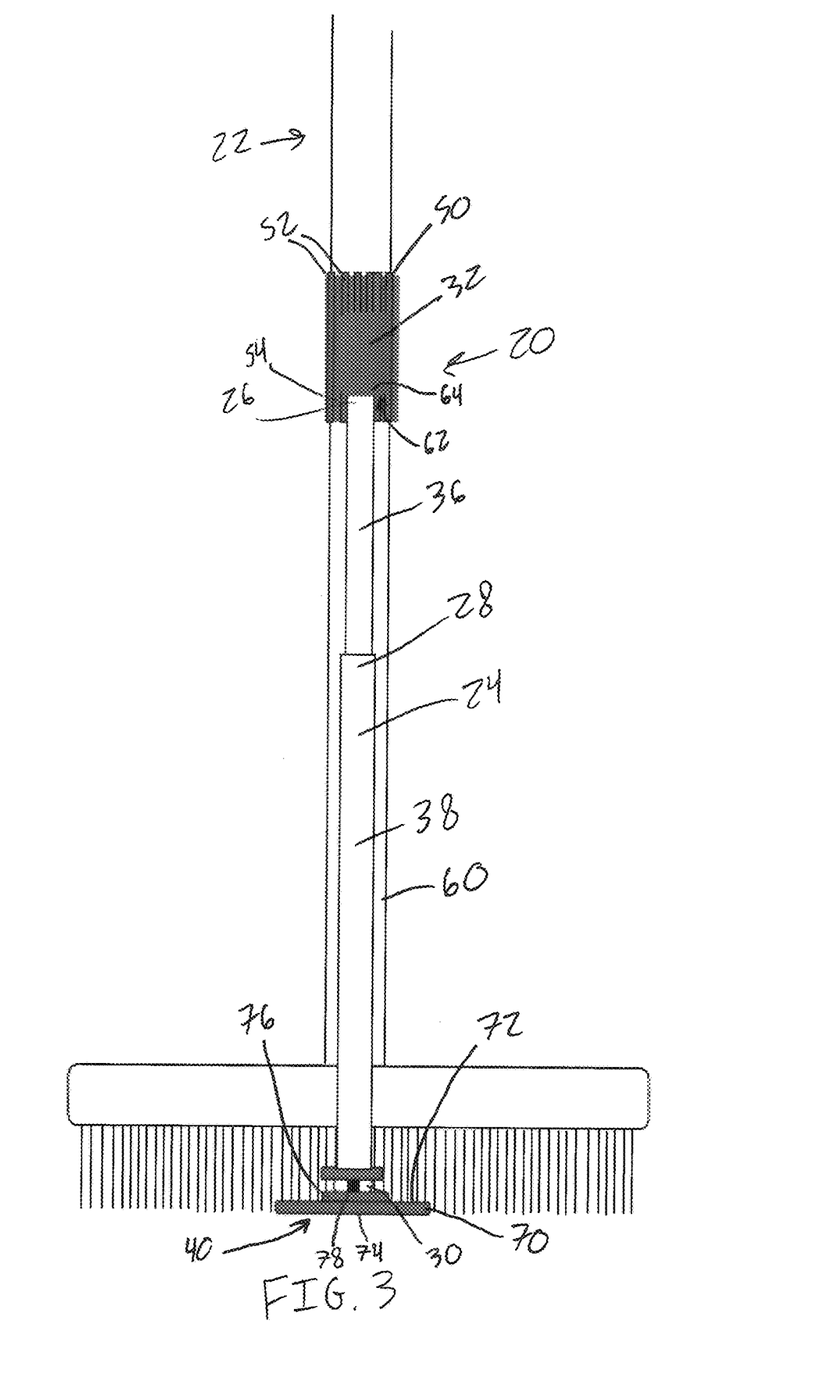
FIG. 3 is a front elevational view of the device and long handled tool of FIG. 1 with the device in an open configuration.
Figure 4:
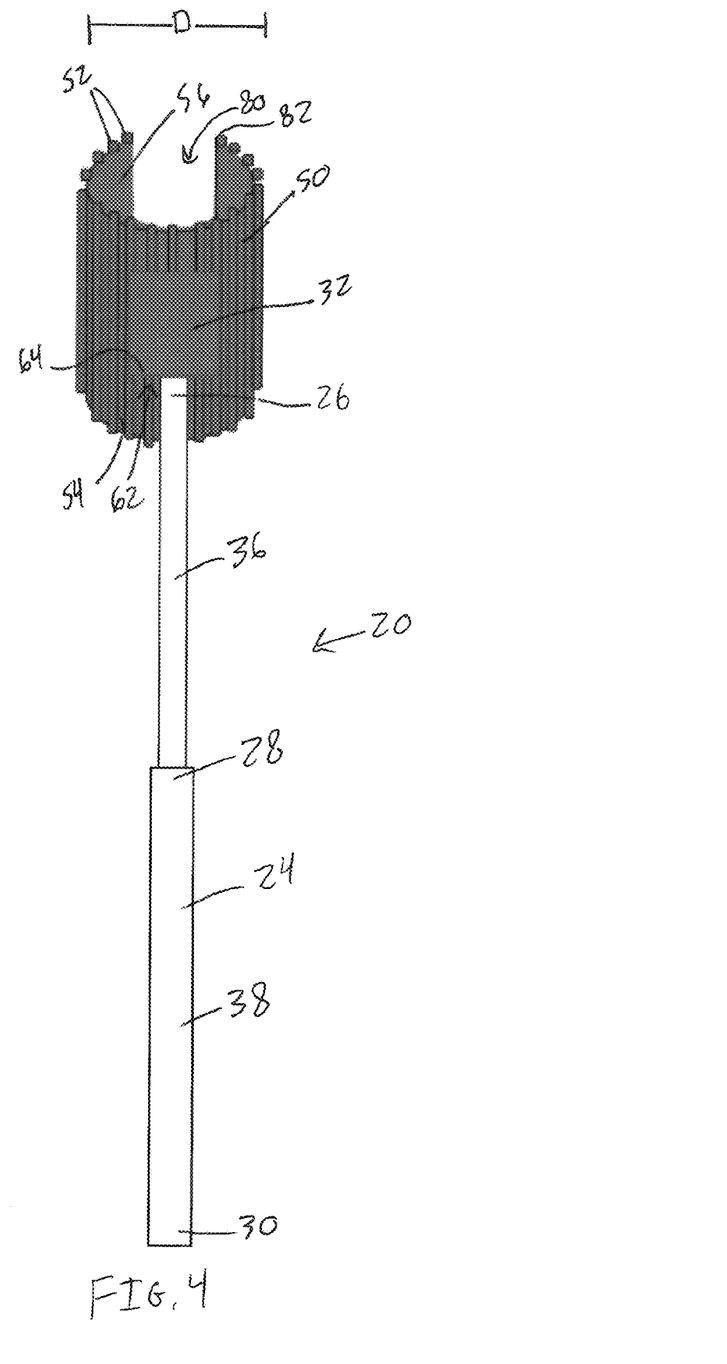
FIG. 4 is a front elevational view of the device of FIG. 1 without a base attached to a bottom end thereof.
Figure 5:
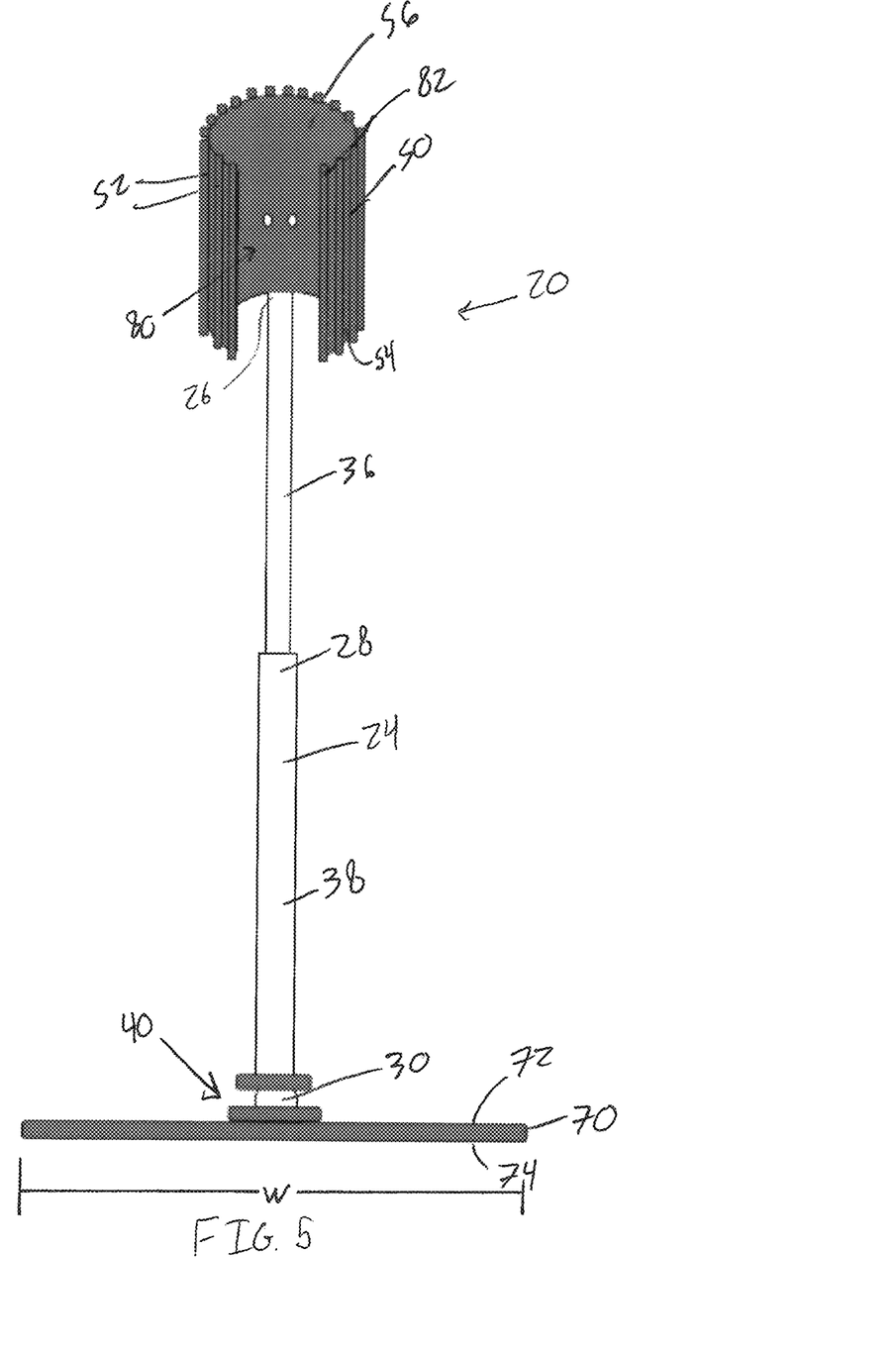
FIG. 5 is a rear elevational view of the device of FIG. 1 with the device in an open configuration.
Figure 6:
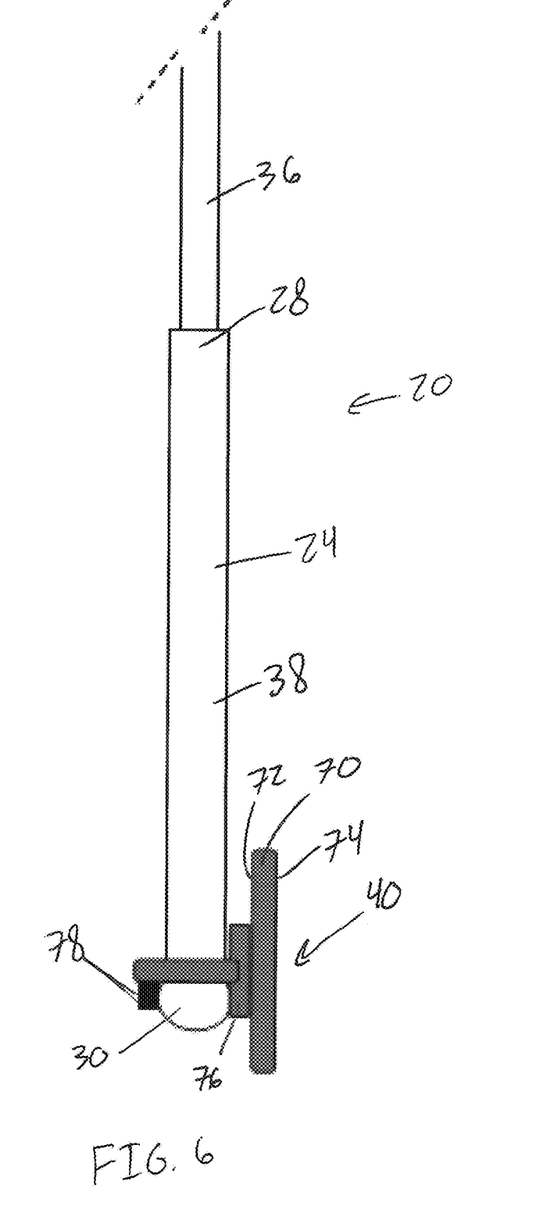
FIG. 6 is a right side elevational view of the device of FIG. 1 without a collar coupled to an upper end thereof, wherein the device is shown in a closed configuration.

As illustrated in FIGS. 1-5 and 7-9, the collar 50 has a plurality of ribs 52 that are generally parallel with the rod 24 when the device is in an inoperable position (see FIG. 1) and circumscribe an outer surface 54 of the collar 50. An inner surface 56 of the collar 50 is generally planar (see FIGS. 4 and 5). In some embodiments, a coating 58 (see FIG. 7) may be applied upon or formed upon the inner surface 56 of the collar 50. The inner surface 56 of the collar 50 interfaces with an exterior surface 60 of the long handled tool 22, as illustrated in FIGS. 1-3. The plurality of ribs 52 are included to allow for greater flexure of the collar 50 when it is manipulated to be secured to the long handled tool 22. The plurality of ribs 52 may have a cross sectional shape (e.g., square-shaped, triangular, rectangular, or any other suitable shape), and may extend in a diagonal or horizontal direction along the collar 50 rather than the vertical direction, as shown in the illustrated embodiments. The plurality of ribs 52 may be included to reduce the cost of the device 20, since the addition of the ribs 52 allows for less material to be utilized in the void spaces therebetween.

In some embodiments, the collar 50 has a diameter D (see FIG. 4) of between about 0.5 inches and about 4 inches, or between about 1 inch and about 3 inches, or about 2 inches. In some embodiments, the collar 50 has a height H1 (see FIG. 1) of between about 1 inch and about 6 inches, or between about 2 inches and about 4 inches, or about 2.5 inches. In some embodiments, the upper section 36 of the rod has a length L1 (see FIG. 7) of between about 4 inches and about 15 inches, or between about 7 inches and about 12 inches, or about 9 inches. In some embodiments, the lower section 38 of the rod 24 has a length L2 (see FIG. 7) of between about 4 inches and about 15 inches, or between about 7 inches and about 12 inches, or about 9 inches. In some embodiments, the plate 70 has a width W (see FIG. 5) of between about 2 inches and about 12 inches, or between about 4 inches and about 8 inches, or about 6 inches. In some embodiments, the plate 70 has a height H2 of between about 1 inch and about 6 inches, or between about 2 inches and about 4 inches, or about 3 inches.

Referring to FIGS. 1, 2, 4, 5, and 7, the collar 50 is generally cylindrically shaped with an opening 80 in a rear side 82 thereof. The opening 80 receives the exterior surface 60 of the long-handled tool 22. Because the collar 50 comprises an elastomeric polymer or other flexible material, the opening 80 may be widened by a user when securing the device 20 to the long-handled tool 22. The collar 50 may have another elongate configuration and/or a different cross-sectional shape. Rather than having a circular cross section, the collar 50 may have a cross section in the form of a triangle, a square, a rectangle, a pentagon, a hexagon, a heptagon, or an octagon. Further, the collar 50 may not include the opening 80, but rather may be operable to be slid over a tip end 84 (see FIGS. 8 and 9) of the long handled tool 22. In a preferred embodiment, the collar 50 is flexible and can be deformed to fit around any number of handles.

Figure 7:
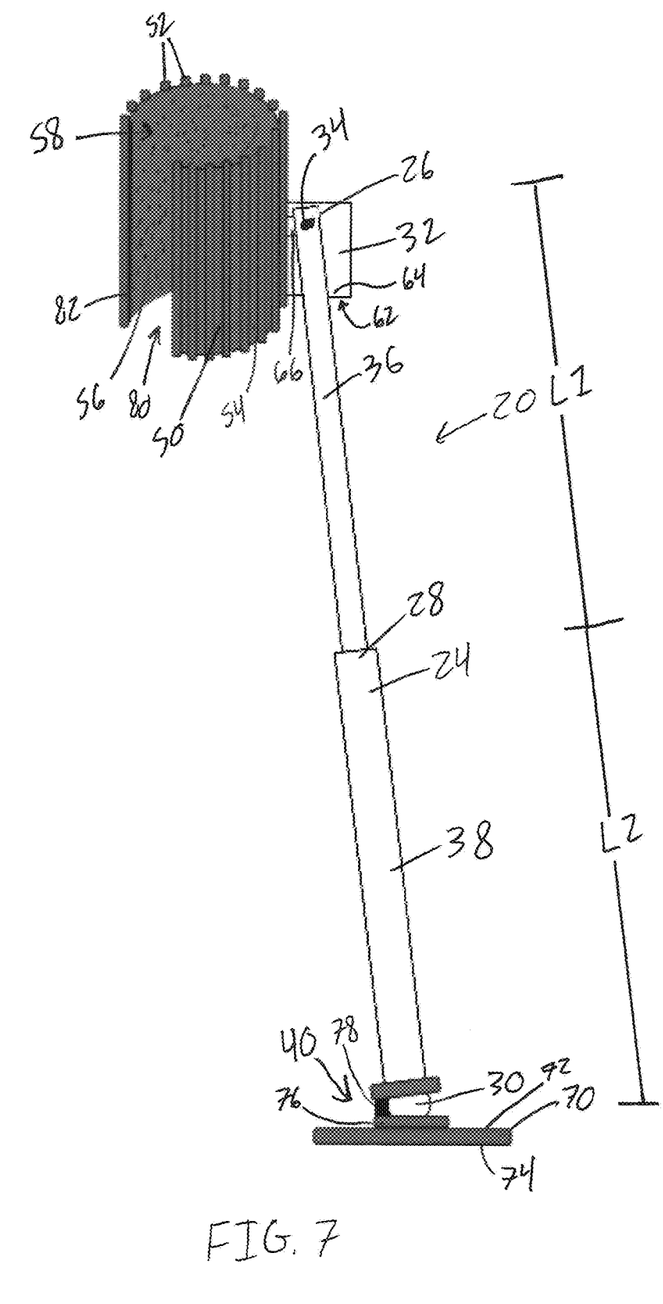
FIG. 7 is a left side elevational view of the device of FIG. 1 with a portion of a collar housing cut away and with the device in a closed configuration.

Referring to FIGS. 1-3, the collar housing 32 is generally in the form of a rectangular box and includes an aperture 62 cut out at a bottom end 64 thereof. The aperture 62 allows the rod 24 the ability to pivot back and forth within the collar housing 32. In some embodiments, the aperture 62 has a size that allows the rod 24 to pivot from an inoperable position (see FIG. 1) to an operable position (see FIG. 2). Referring to FIG. 7, a cross sectional view of the housing 32 is shown.

As illustrated in FIG. 7, the upper section 36 of the rod 24 is pivotally connected with a projection 66 that extends from, and is coupled with, the outer surface 54 of the collar 50. The upper section 36 of the rod 24 may be coupled with the projection 66 via any of the aforementioned securement mechanisms 34 or any other suitable securement mechanism.

Figure 8:
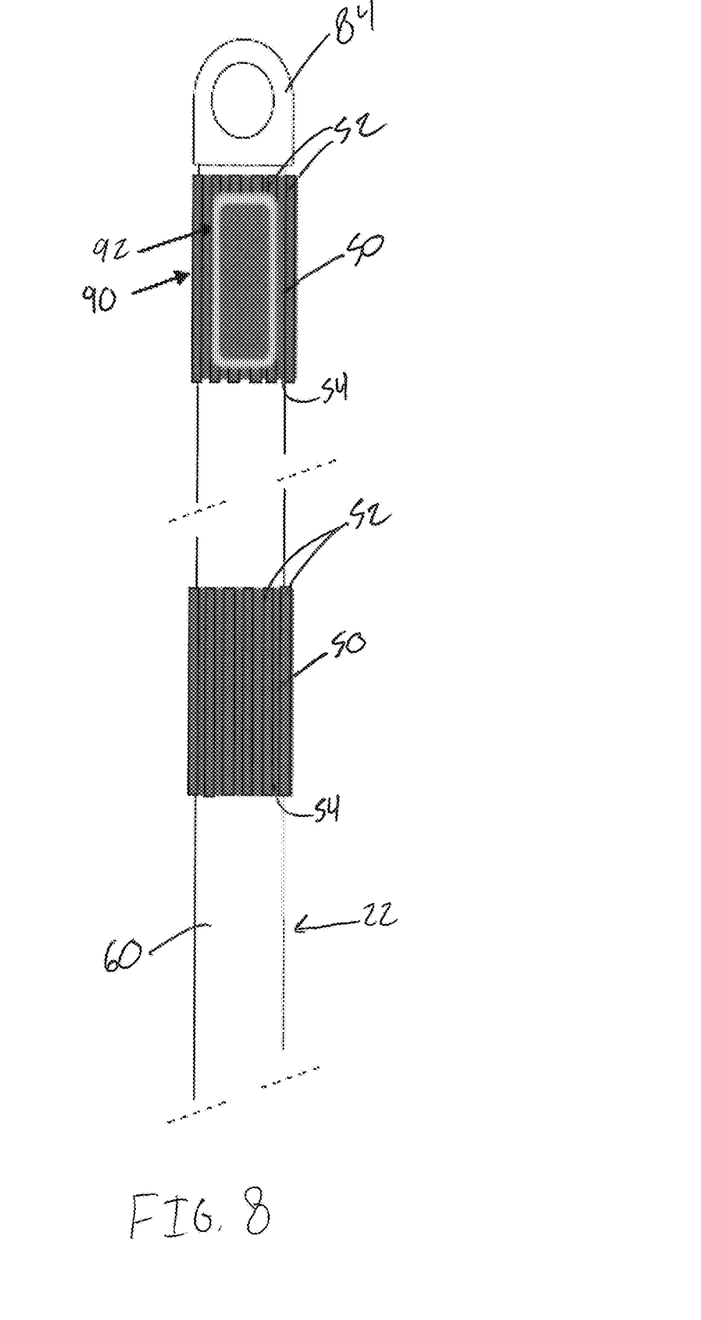
FIG. 8 is a rear elevational view of another embodiment of the device of FIG. 1 attached to a long handled device in two alternative positions and further including a magnetic strip provided along a collar.
Figure 9:
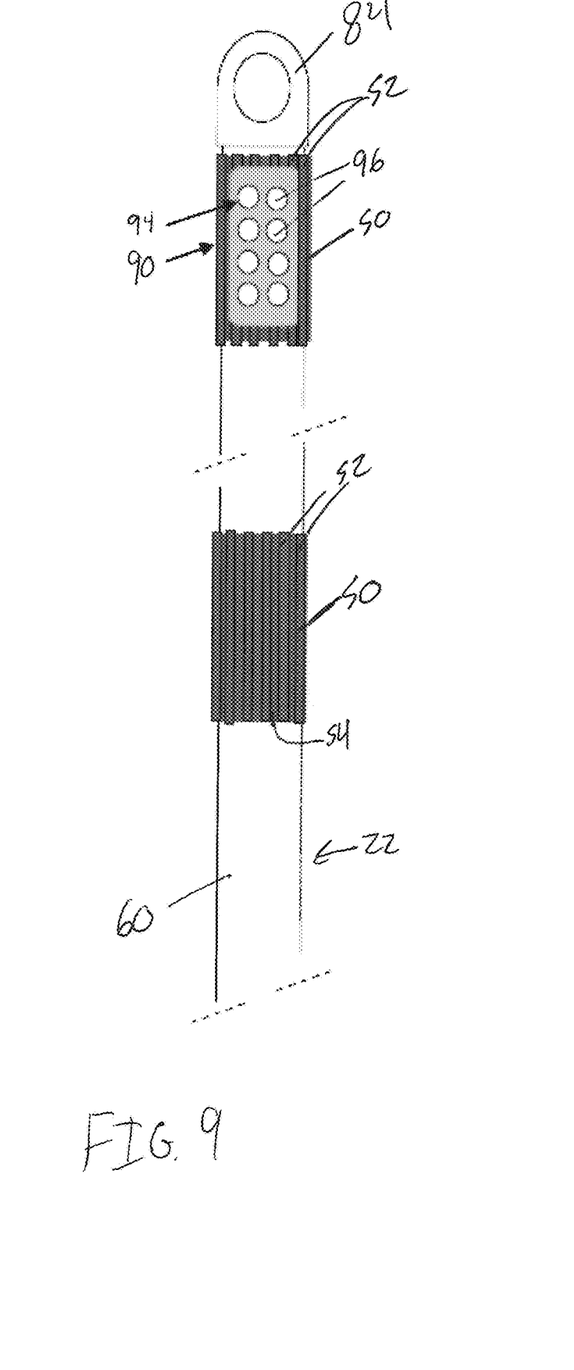
FIG. 9 is a rear elevational view of another embodiment of the device of FIG. 1 attached to a long handled device in two alternative positions and further including a plurality of suction cups provided along a collar.

Referring now to FIGS. 8 and 9, alternative attachment mechanisms 90 are shown which allow a user to attach the device 20 and/or the long handled tool 22 to a wall (not shown). Referring to FIGS. 8 and 9, the collar 50 is shown in two alternative positions along the long handled tool 22. Referring to FIG. 8, the collar 50 is shown having a magnet 92 coupled therewith. The magnet 92 allows the device 20 to be attached to any magnetic surface. Further, if the collar 50 is coupled with the long handled tool 22, the long handled tool 22 can be attached to a magnetic surface. Referring to FIG. 9, a suction cup pad 94 is shown having a plurality of suction cups 96 thereon, wherein the suction cup pad 94 is attached to a portion of the collar 50. The plurality of suction cups 96 can be attached to a planar surface in the same way that the magnet 92 can be attached to a magnetic surface, i.e. to store either the device 20 or the long handled tool 22, depending on whether the collar 50 is attached to the long handled tool 22.

Referring now to FIGS. 1-3, the lower section 38 of the rod is pivotally coupled to the foot 40 with any one of the aforementioned securement mechanisms 34 or any other suitable securement mechanism. In some embodiments, the foot comprises a plate 70 having a top face 72 and a bottom face 74. The bottom face 74 of the plate 70 is formed to interface with the ground when the device 20 is in use, i.e. when the device 20 is in an operable position or configuration. In some embodiments, the bottom face 74 includes a rough surface, spikes, bumps, or grooves to provide for frictional engagement with the ground. In some embodiments, an intermediate plate 76 is provided above the plate 70, coupled with the top face 72 thereof. In some embodiments, one or both of the plate 70 and the intermediate plate 76 have a depression that receives the distal end 30 of the rod 24, which may be in the form of a semi-spherical ball-bearing. In some embodiments, one or more arms (not shown) project upward from one of the intermediate plate 76 or the plate 70 and engage with the distal end 30 of the rod 24. In some embodiments, a pivot stop 78 is provided adjacent the distal end 30 of the rod 24 to prevent over rotation of the plate 70. In some embodiments, a mechanism for engaging the plate 70 is provided along the foot 40. In some embodiments, a button is provided along the rod 24 to release or retract the foot 40 such that the foot 40 can be moved from the operable to inoperable position and vice versa.

When a user intends to utilize the device 20, the user grasps the collar 50 or the collar housing 32 and snaps the collar 50 to the exterior surface 60 of the long-handled tool 22. Once the collar 50 is snap fit to the long-handled tool 22, the user engages the rod 24 and the foot 40 into the inoperative state, as illustrated in FIG. 1. In this manner, a locking mechanism (not shown) may be connected between, for example, the collar housing 32 and the securement mechanism 34 to lock the rod 24 in position in the inoperative state. In other embodiments, any other locking mechanism that locks the rod 24 in the inoperative position may be utilized. The user may then use the long-handled tool 22 for its intended use, which may include sweeping, shoveling, raking, or any other chore. When the user desires to rest the long-handled tool 22, the user disengages the foot 40 from the inoperative state (see FIG. 1) to the operative state (see FIG. 2). This engagement may include pressing one or more buttons (not shown) along the rod 24, or may include simply pivoting the foot 40 about the distal end 30 of the rod 24 such that the foot 40 is in the configuration as illustrated in FIG. 2. At this point, the device 20 is in the operable configuration.

The benefits of the invention as disclosed herein will now be described. The device 20 eliminates the need of tool users to bend over to pick up long handled tools that must be placed on the ground or to rest tools against structures when not in use. The rod 24 of the device 20 has three major segments, the proximal end 26, the midsection 28 and the distal end 30. The proximal end 26 of the device 20 clips to the handle of tools such as mops, brooms, rakes and other household and garden tools. The midsection 28 is comprised of lightweight material, as previously described. The midsection 28 includes a telescoping feature allowing the device 20 to accommodate a variety of handle lengths. When the long handled tool is not in use, the rod 24 is retracted to prevent interference with tool use. When the rod 24 is extended, the foot 40 on the distal end 30 provides stability to the tool 22. The bottom face 74 of the plate 70 of the foot 40 can be covered with a variety of non-slip grips. The device 20 is especially useful to individuals with limited mobility to aid in daily tasks but can benefit a wide-range of individuals.

It will be appreciated by those in the art that other configurations not specifically mentioned herein are possible. Any of the embodiments described herein may be modified to include any of the structures or methodologies disclosed in connection with different embodiments. Further, the present disclosure is not limited to collar and/or rod shapes/sizes of the type specifically shown. Still further, the collars of any of the embodiments disclosed herein may be modified to work with various types of long handled tools consistent with the disclosure herein.

While terms such as front, side, rear, left, right, etc. may be utilized herein, such terms are not intended to be limiting. More particularly, such terms are utilized herein to described features or components in relation to one another.

Various features and advantages of the invention are set forth in the following claims.

The invention claimed is:

1. A device for supporting a long handled tool in an upright position, the device comprising:
   a rod comprising an upper section and a lower section;
   a collar pivotally attached to the upper section of the rod, the collar including a plurality of flexible ribs disposed along an outer surface; and
   a foot pivotally coupled to the lower section of the rod, wherein one of the upper and lower sections is telescopically received within the other of the upper and lower sections of the rod, and
   wherein the collar is cylindrically shaped and has an opening on a front side thereof to receive the long handled tool.

2. The device of claim 1, wherein the plurality of flexible ribs comprises a plurality of vertical ribs.

3. The device of claim 1, wherein the upper section and the lower section of the rod comprise polypropylene.

4. The device of claim 1 further comprising an attachment mechanism coupled with an outer surface of the collar.

5. The device of claim 4, wherein the attachment mechanism is a magnet.

6. The device of claim 4, wherein the attachment mechanism is a suction cup pad having a plurality of suction cups provided thereon.

7. The device of claim 1, further comprising a pivot stop provided along a distal end of the lower section of the rod.

8. The device of claim 1, wherein the foot includes a nonslip pad.

9. A device for supporting a long handled tool in an upright position, the device comprising:
- a telescopically maneuverable rod comprising an upper section and a lower section;
- an elastomeric cylindrically shaped collar having an interior surface that is snap fit with a tool;
- a collar housing coupled with an exterior surface of the collar, the collar housing having a first face facing the collar, a second face facing away from the collar, a bottom end between the first and second faces, and an aperture formed in the bottom end, the aperture configured to receive an end of the rod; and
- a foot pivotally coupled to the lower section of the rod.

10. The device of claim 9, further comprising a plurality of ribs provided along at least a portion of the exterior surface of the collar.

11. The device of claim 9, wherein an interior surface of the collar has a coating applied thereto.

12. The device of claim 9, wherein the collar housing comprises a rectangular box and wherein the aperture permits pivotal movement of the rod.

13. The device of claim 9, further comprising a protrusion extending from the exterior face of the collar into the housing.

14. The device of claim 13, wherein the end of the rod is coupled with the protrusion.

15. The device of claim 9, wherein a bottom surface of the foot includes a nonslip pad.

16. A device for supporting a long handled tool in an upright position, the device comprising:
- a telescopically maneuverable rod comprising an upper section and a lower section;
- a collar having an interior surface that is snap fit with a tool, the collar coupled with an end of the rod, and the collar having a plurality of flexible ribs provided along an exterior surface thereof;
- a collar housing coupled with the exterior surface of the collar; and
- a foot pivotally coupled with the lower section of the rod.

17. The device of claim 16, wherein the rod comprises polypropylene.

18. The device of claim 16, wherein the collar housing comprises a rectangular shaped aperture provided in a bottom end thereof for pivotal movement of the rod.

19. The device of claim 16, wherein the upper section and the lower section of the rod are telescopically engaged with a moveable friction fit.

20. The device of claim 16, wherein the collar comprises high density polyethylene.

\* \* \* \* \*